Figure 1:
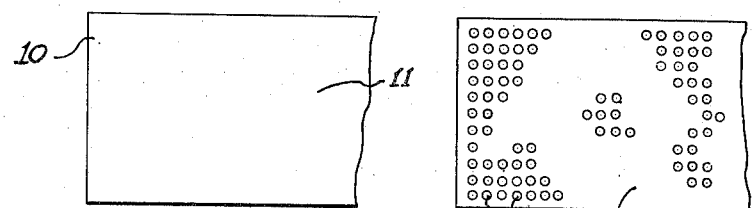
Figure 2:
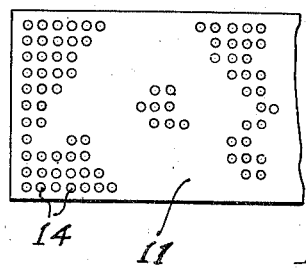
Figure 3:
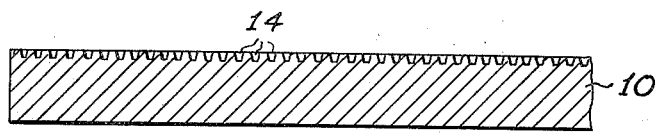
Figure 4:
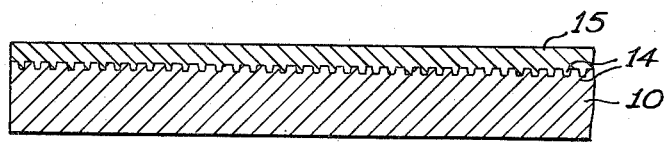
Figure 5:
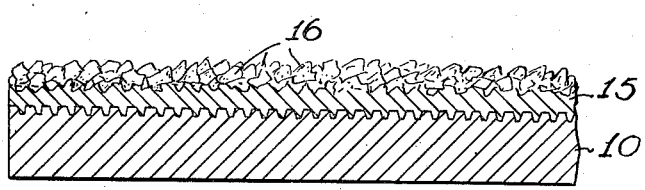
Figure 6:
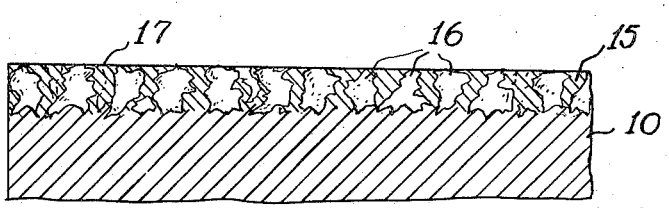
Figure 7:
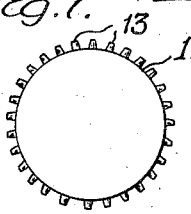
Figure 8:
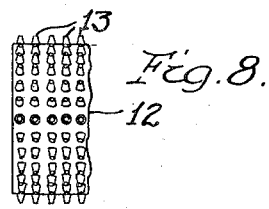

Aug. 19, 1941.     H. J. HYDE     2,253,298

BUILDING BOARD

Filed Sept. 9, 1938

INVENTOR.
HUBERT J. HYDE
BY
ATTORNEY.

Patented Aug. 19, 1941

2,253,298

UNITED STATES PATENT OFFICE pressure will result in the pieces of facing material which are of sufficient size extending through the adhesive layer 15 and into the board 10 in such a manner that each piece, so extending, will act as a pin or nail holding the facing layer and board in an intimate relationship. The facing surface 17 of the siding will at this stage present a substantially smooth appearance ornamented by the exposed surfaces of the pieces of granular material 16. The adhesive is now allowed to thoroughly harden and the facing layer composed of the adhesive 15 and stone 16 is permanently locked to the board 10. Obviously, if a homogeneous appearance is desired, sufficient stone 16 must be used to completely cover the adhesive.

It will be apparent that a wide variety of decorative effects may be worked out by varying the adhesive and granular materials used. Regardless of what materials are used, however, the method remains the same and it will be understood that the above description is by way of illustration only and that the protection is limited only by the scope of the appended claims.

What is claimed is:

1. A building material comprising a wooden board adapted to be secured directly to the frame studs of a building, said board having a surface having a multiplicity of preformed indentations, a weather covering for said surface and a multiplicity of pebbles having one portion of each thereof exposed outwardly of said covering and each having another portion thereof extending into said indentations for engagement therewith, said pebbles and said covering presenting a substantially smooth finish.

2. A building material comprising a wooden board having a surface with a multiplicity of preformed indentations, a weather covering for said surface and a multiplicity of pebbles embedded in said covering, a substantial number of said pebbles being individually large enough to extend from within said indentations entirely through said covering whereby said pebbles act to pin said covering to said board and to provide an ornamental exposed surface therefor.

HUBERT J. HYDE.